US006973485B2

(12) United States Patent
Ebata et al.

(10) Patent No.: US 6,973,485 B2
(45) Date of Patent: Dec. 6, 2005

(54) PROXY SERVER SELECTING SERVER AND PROXY SERVER

(75) Inventors: Tomoichi Ebata, Kawasaki (JP); Hiromichi Ito, Yokohama (JP); Masato Saito, Yokohama (JP); Yoshihiro Kamata, Yokohoma (JP)

(73) Assignee: Hitachi, Ltd., Tokyo (JP)

( * ) Notice: Subject to any disclaimer, the term of this patent is extended or adjusted under 35 U.S.C. 154(b) by 549 days.

(21) Appl. No.: 10/283,108

(22) Filed: Oct. 30, 2002

(65) Prior Publication Data

US 2003/0061282 A1  Mar. 27, 2003

Related U.S. Application Data

(63) Continuation of application No. 09/166,861, filed on Oct. 6, 1998, now Pat. No. 6,513,061.

(30) Foreign Application Priority Data

Oct. 7, 1997 (JP) .................................. 9-274476

(51) Int. Cl.[7] ............................................. G06F 15/16
(52) U.S. Cl. ..................... 709/219; 709/229; 709/225; 709/226; 709/217; 709/218
(58) Field of Search ............................... 709/217–219, 709/225, 226, 203, 229

(56) References Cited

U.S. PATENT DOCUMENTS

| | | | |
|---|---|---|---|
| 5,729,689 A | | 3/1998 | Allard et al. |
| 5,774,660 A | * | 6/1998 | Brendel et al. ............. 709/201 |
| 5,828,843 A | | 10/1998 | Grimm et al. |
| 5,903,725 A | * | 5/1999 | Colyer ........................ 709/203 |
| 5,991,810 A | * | 11/1999 | Shapiro et al. ............. 709/229 |
| 6,006,264 A | * | 12/1999 | Colby et al. ................ 709/226 |
| 6,513,061 B1 | * | 1/2003 | Ebata et al. ................ 709/203 |

FOREIGN PATENT DOCUMENTS

| | | |
|---|---|---|
| JP | 07093238 | 4/1995 |
| JP | 09163344 | 6/1997 |

OTHER PUBLICATIONS

Y. Mitsuwa, "Firewall-Protecting not only in-house LAN but also out-house public server" Nikkei Byte, No. 169, Nikkei BP-sha, Sep. 22, 1997, pp. 216-222.

(Continued)

*Primary Examiner*—Frantz B. Jean
(74) *Attorney, Agent, or Firm*—Mattingly, Stanger, Malur & Brundidge, P.C.

(57) ABSTRACT

In an internet having a server for providing service, a client for receiving the service, plural proxy servers for standing proxy for an access to the server done by the client, and a proxy server selecting server for noticing an IP (Internet Protocol) corresponding to a domain name of the client in response to an inquiry with the domain name added thereon, the proxy server selecting server receives a request message with the domain name of the server for providing the target service from the client. Then, the proxy server selecting server notifies the client of the IP address of the most approximate server to the client in place of the IP address of the server, based on the physical/logical location information, and if necessary, the periodically obtained load information of the proxy servers. The client recognizes the proxy server of the IP address given thereto as the server for providing the target service and then makes access to the proxy server.

5 Claims, 13 Drawing Sheets

OTHER PUBLICATIONS

J. Nakajima, "Basic knowledge of name services and DNS", Interface, vol. 23, No. 11, CQ Shuppan K.K., (Issue Data printed on the periodical; Nov. 1, 1997, Sale Date: Sep. 25, 1997, Accession Date by Reference Library of Japanese Patent Office, Sep. 26, 1997, pp. 128-137.

Translation of Douglas E. Comer, "Internetworking with TCP/IP Principle, Protocol and Architecture", Published by Kyoritsu Shuppan-Sha.

* cited by examiner

FIG. 8

| SPS NAME | IP ADDRESS | LOCATION | TEL | LOAD |
|---|---|---|---|---|
| SPSKAWASAKI | 133. 144. 98. 13 | N35' 35' 04<br>E139' 30' 01 | 03-372 | 30% |
| SPSODAWARA | 135. 213. 43. 2 | N35' 16' 05<br>E139' 10' 39 | 0424-21 | 70% |

625

801

802

PROXY SERVER SELECTING SERVER AND PROXY SERVER

This application is a Rule 53(b) continuation of U.S. application Ser. No. 09/166,861, filed Oct. 6, 1998, U.S. Pat. No. 6,513,061 the subject matter of which is incorporated herein by reference.

BACKGROUND OF THE INVENTION

The present invention relates to a server-client network system, and more particularly to the network technique which is arranged to curtail loads burdened on the network and a server and provide a comfortable working environment to each client.

Before describing the invention, the following four known arts will be described.

(1) Domain Name System (DNS)

The internet employs a system that uses a domain name represented by hierarchically setting each logical group called a domain and delimiting the logical group with a period.

The correspondence between a domain name and an IP address, (which corresponds to a network address in the internet, for example, the address being represented by figures delimited with some periods) is managed by a DNS server. The DNS server operates to swap information with another DNS server if necessary. The swapping operation results in making it possible to correspond all the domain names to the IP addresses included in the internet.

A client makes access to a destination server for providing the target service the client would like to reach through the use of the internet. For this purpose, in actual, the client uses the IP address that is a physical address in place of the host name. It means that the client has to obtain the IP address of the server for providing the target service the client would like to reach.

If, therefore, the client does not know the IP address of the server for providing the target service, the client indicates the domain name of the target server to the DNS server pre-registered as its own server for inquiring the IP address of the target server. In response to the inquiry, the DNS server searches the corresponding IP address to the domain name of the target service server and notifies the client of the IP address.

In addition, if the DNS server of inquiry cannot obtain the IP address of the service server, the DNS server inquires the upper DNS server of it.

(2) Proxy Server

Between a network inside of an organization that needs high security and the internet located outside of the network, a firewall for access control is normally built. The proxy server is a proxy gateway developed in effect when the communications inside or outside of the organization are prohibited by the firewall.

For example, inside of a local area network (referred to as an LAN), a user cannot directly communicate with a wide area network (referred to as a WAN). To overcome the inconvenience, a segment area called "Barrier Segment" is provided between the LAN and the WAN, so that the client user temporarily has to do remote log-in to the server operating on the barrier segment and then makes access to the server on the WAN side.

This method, however, needs to prepare many user accounts (right of use given in the user registration) in the server operating on the barrier segment. This disadvantageously leads to increasing the security holes.

Under these circumstances, a proxy server has been developed which allows the server or the client of the network inside of the organization to access a resource or data of Gopher, WWW or the like without having to prepare any user account for the server operating on the barrier segment.

The proxy server is operated on the firewall. The proxy server keeps special ports open so that it can receive messages from plural clients. Then, the proxy server operates to transfer the received messages to the server for providing the target service the client would like to reach. It thus serves to be proxy for the client.

The proxy server receives a message from the client without user authentication. The proxy server uses the IP address that corresponds to the physical address of the client for the communications with the client, so that the log-in of the client to the proxy server is unnecessary if not specified.

The proxy server has a function of relaying a client's access to the resource or the data of the Gopher or the WWW, for example. The client just communicates with only the proxy server without direct communications with the server on the WAN side.

This proxy server eliminates the necessity of directly exchanging the message between the LAN and the WAN, thereby making it impossible for the WAN side to unjustly attack the LAN side.

(3) Proxy Cache Server

When developing the foregoing proxy server, a proxy server provided with a cache function has been developed as its byproduct.

The proxy server has been developed for the purpose of relaying the client's access to the resource or the data. Hence, highly plausibly, two or more clients on the LAN side may refer to the data at a time.

If two or more requests for referring to the data takes place, the proxy server refers to the data of the server on the WAN side and gives back the data to the clients on the LAN side who have issued the referring requests.

As mentioned above, the proxy server may operate to temporarily cache the resource or the data referenced once by itself in a storage medium such as a disk and give back the data temporarily cached in the disk to the clients on the LAN side who have issued the referring requests without having to access the server on the WAN side if two or more requests for referring to the resource or the data given by the clients take place at a time. The proxy server provided with this type of function is referred to as a proxy cache server.

The proxy cache server helps to curtail the traffic on the WAN. It is more advantageous to the user, because the communications on the WAN is lower in speed and higher in cost than those on the LAN.

Moreover, the reduction of the access times given from the client on the LAN to the server on the WAN makes great contribution to lessening the load burdened on the server. Further, the user on the LAN can reuse the resource or the data cached in the proxy cache server that is a local server, so that the user may enjoy a comfortable response to the access.

In addition, the proxy cache server may make sure of a time stamp of the resource or the data cached in a storage medium such as a disk so that it may access the server on the WAN again about the resource or the data having the previous time stamp than a given period. This operation allows the proxy cache server to obtain the resource or the data of the latest version.

(4) Client-Store System

As an inexpensive internet access device of the next generation, an inexpensive terminal is designed wherein only the internet function and protocol to be supported as minimum level are mounted.

This type of terminal has to support as minimum functions many internet communications protocols such as Web and FTP (File Transfer Protocol) and a networking standard service of a network sharing system, a UDP (User Datagram Protocol), a TCP (Transmission Control Protocol), a DHCP (Dynamic Host Configuration Protocol), a BOOTP (Bootstrap Protocol), and the like.

Unlike personal computers, it is preconditioned that this type of terminal requires the server to concentratively manage all the applications and the promotion. However, this type of terminal does not include a harddisk. Hence, each time it is started, the application program has to be downloaded from the server. This results in disadvantageously increasing the load burdened on the server and the network.

In place of this type of terminal, a system is also provided for reducing distribution of the application program from the server to a minimum through the use of the harddisk of the existing personal computer.

When the resource is transferred from the server, this type of system operates to record the resource in the harddisk and reuse the resource recorded in the harddisk if necessary.

This system does not need to constantly read the resource from the server. Further, in using the resource or periodically, the system is operated to check change of the resource on the server. It thus has an advantage that the resource of the latest version may be constantly started on the client side. On the other hand, however, this type of system would be more disadvantageous in portability and cost than the ordinary portable terminal.

SUMMARY OF THE INVENTION

The conventional DNS is a system for obtaining an IP address for a physical address of a server from a domain name received from the client in a one-to-one manner when the client makes access to the server. However, it has the following disadvantages.

In a case that two or more servers for providing the same service are located distributively on the network, it is difficult for the client itself to determine the most approximate server to the client user, because the client has to manage the name of each server, determine the most approximate server, and request the service of the server. This operation is quite annoying.

Further, in a case that there are two or more networks each of which has two or more servers for providing the same service distributively located thereon, the user of the client has to access the proper server by considering the conditions of the load burdened on each network and each server.

Moreover, in a case that two or more servers for providing the same service are located distributively on the network, for keeping the comfortable response in working, the user of the client has to access the server consciously of a physical or a logical distance between the server and the client.

Herein, two or more servers for providing the same servers distributively located on the network concretely may include the conventional proxy server and the conventional proxy cache server.

However, the conventional proxy server (hereafter, the term "proxy server" includes the "proxy cache server".) has no means for authenticating the user of each client. The use of this proxy server, therefore, makes it impossible to provide the service for each user.

Further, the terminal having no storage device such as a harddisk cannot employ the foregoing conventional client-store system.

Moreover, if the client makes use of the application program that needs to frequently communicate with the server, the client cannot satisfactorily meet the processing.

For example, in a case that the application program (for example, the access to the database or the client-server type Kana-Kanji transformation) includes many processes of enabling the client to transmit a message to the server and obtaining the response from the server, the accesses from the client are concentrated on the server, so that the loads burdened on the server and the network are increased. In particular, in the case of using a low-speed network such as the WAN, the response on the client side is made remarkably inferior.

In order to overcome the foregoing shortcomings, a system is considered for distributing many proxy servers on the network, bringing each client in correspondence to a local proxy server closer thereto, and prompting the corresponding proxy server to access the target server. However, this system has a new disadvantage that the management of each proxy server is more costly.

Further, in a case that many proxy servers are distributively located on the network, the proxy server and the client are required to set the network address for corresponding both to each other. Once it is set, the dynamic change of the setting is quite difficult. Further, the user account of the client is managed only by the corresponding proxy server, the user cannot do any work on a client of another place.

It is a main object of the present invention to provide a comfortable working environment to a client in which only by specifying a logical node name of a server for providing a target service the client would like to reach, the most approximate proxy server to the client can be automatically selected in consideration of the loads burdened on the network and the server and the location of the client.

It is another object of the present invention to provide a comfortable working environment to the client in which the traffic on the network and the load burdened on the server are curtailed.

In order to achieve the foregoing object, unlike the conventional DNS server that manages the stationary correspondence between the domain name and the network address, the dynamic DNS server according to the present invention is arranged to manage the location information and the load conditions of the proxy servers distributed located on a network, constantly select the proxy server having the most approximate access environment to a client based on the location information of the client and the managed content when notifying the client of an address of the server corresponding to the domain name inquired by the client, and notify the client of the address of the selected proxy server, for the purpose of solving the problem about the address of the proxy server. Moreover, if just one proxy server is located on a network, the present invention can offer the proper effect. Concretely, when the dynamic DNS server according to the present invention determines that the proxy server can offer the more comfortable access environment to the client than the server for the domain name inquired by the client, the dynamic DNS server operates to notify the client of the network address of the proxy server in place of the network address of the server for the domain name.

In the foregoing DNS server, merely by specifying a logical node name of the server from which the client would obtain the service, the client can make access to the most approximate proxy server that is selected in consideration of the loads burdened on the network and the server and the location of the client. Hence, the dynamic DNS of the invention can provide the user of the client with the comfortable working environment without lowering a response characteristic.

It is preferable that the location information is a combination of logical location information for the network address and physical location information for the information representing a connecting location on the network. The latter information may be selected as an area code of a place where the proxy server is located or a latitude and a longitude of the proxy server.

In order to obtain the load conditions of the proxy server, the proxy server may be arranged to give back the load condition of itself in response to an inquiry sent from a proxy server selecting unit or autonomically notify the proxy server of the load condition at periodic terms.

In order to achieve the foregoing another object, the dynamic DNS server according to the invention is arranged to distributively locate plural proxy servers on a network so that the proxy server may communicate a resource or data with the server through another path rather than a path through which the server provides its service, for the purpose of curtailing the traffic and the load of the server.

In the foregoing dynamic DNS server, for example, the proxy server may be arranged to obtain a resource on the server through another path rather than the path through which the server provides its service. In this arrangement, if communications between the client and the server frequently take place, the proxy server can provide the client with the comfortable working environment.

Further, for example, the proxy server may be arranged to communicate the proper user data to the user of the client and the information thereabout with the server through another path rather than the path through which the server provides its service if necessary. In this arrangement, the proxy server can implement the service for each user without managing the user account.

According to the present invention, the proxy server selecting unit (corresponding to the foregoing dynamic DNS server) is provided to manage the location information and the load condition of the proxy servers distributively located on the network, when notifying a client of the address of the server for the domain name inquired by the client, select the most approximate proxy server to the client based on the location information of the client and the managed content, and notify the client of the address of the selected proxy server.

Merely by specifying the server from which the client would obtain the service, therefore, the client can constantly make access to the most approximate proxy server when accessing the server. The server selecting unit can provide the user of the client with the comfortable working environment without lowering a response characteristic.

According to the present invention, the proxy server is arranged to communicate the resource or data with the server through another path rather than the path through which the server provides its service.

The proxy server, therefore, provides a capability of downloading the resource or data located in the server and caching it on the timing when the request from the client is received and providing the client with the cached resource or data, for the purpose of curtailing the traffic and the load of the server.

In particular, in a case that the server manages the resource or data for each user, the proxy server enables to download the resource or data required by the user of the client for accessing the proxy server itself from the server, cache it, and then provide the client with the cached resource or data.

Further, if a client's access to the server frequently takes place, the proxy server is arranged to download the resource or data existing in the server, cache it, and provide the client with the cached resource or data. In this arrangement, the proxy server makes it possible to curtail the traffic and the load of the server and provide the client with the comfortable working environment to the user.

BRIEF DESCRIPTION OF THE DRAWINGS

FIG. 8 is an explanatory view showing a content of an SPS information list included in the DDNS server;

FIG. 9 is an explanatory view showing an operation executed when the NC does a log-in;

DESCRIPTION OF THE PREFERRED EMBODIMENTS

Hereafter, the description will be oriented to embodiments of the present invention with reference to the appended drawings.

Figure 1:
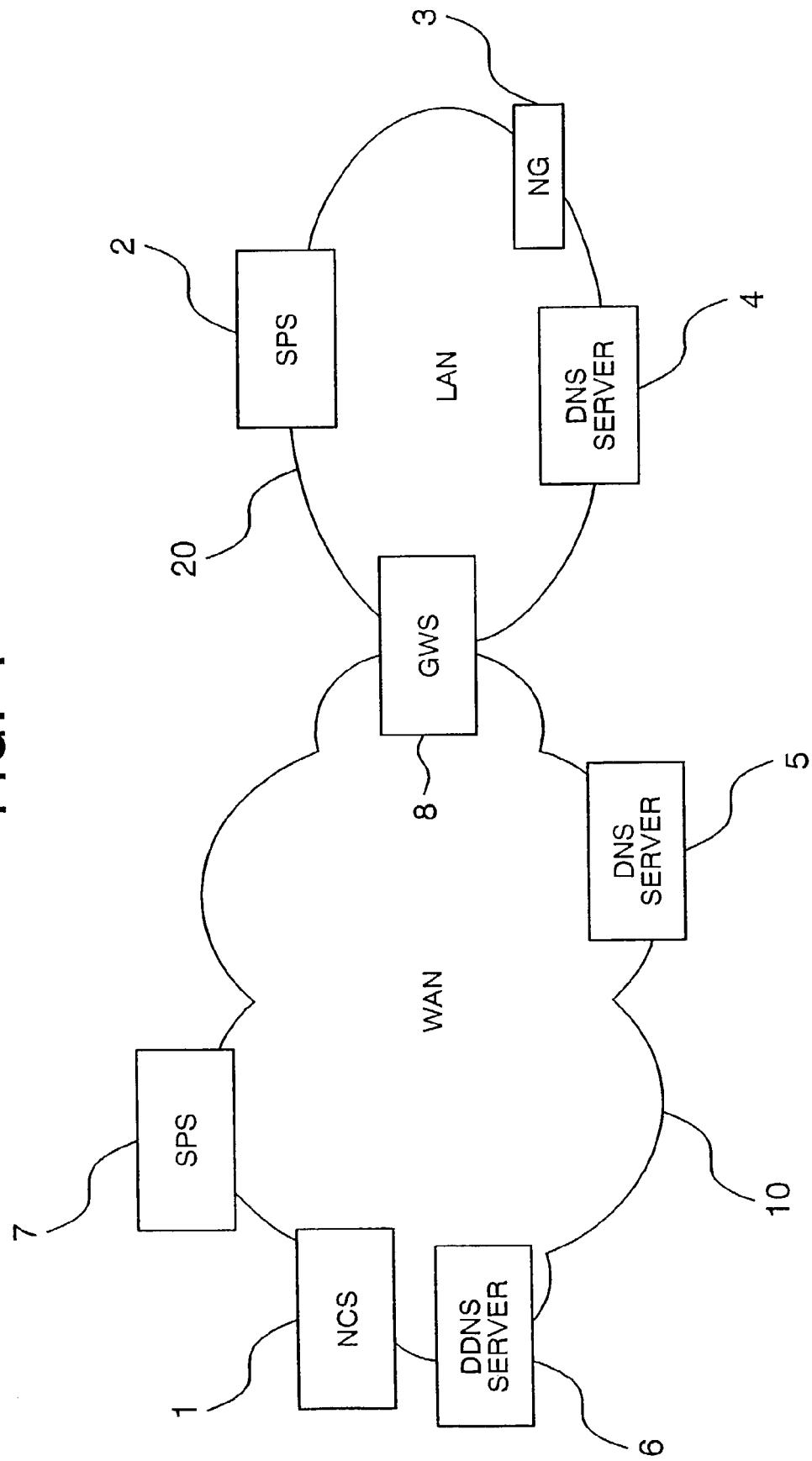
FIG. 1 is a diagram showing an embodiment of a network system to which the present invention applies.

FIG. 1 is a diagram showing an embodiment of the network system to which the present invention applies.

In FIG. 1, a numeral 10 denotes a WAN. A numeral 20 denotes a LAN. Both of the networks use an internet protocol (referred to as an IP) as a protocol of a network layer.

The computer node (referred simply to as a node) 1 is connected to the WAN 10. The node 1 is a network computer server (referred to as an NCS) for executing a program stored in a memory located in the node 1 itself and providing a client inside the network with an NC service on the program.

Numerals 2 and 7 denote nodes which are both connected to the WAN 10 and the LAN 20. The nodes 2 and 7 are service proxy servers (referred to as an SPS) for executing a program stored in a memory located in the node itself and relaying an access from a client to the NCS 1.

A numeral 3 is a node which is connected to the LAN 20. The node 3 is a network computer (referred to as an NC) for executing a program stored in a memory located in the node itself so that it may be operated as a client for receiving the service provided by the NCS 1.

Numerals 4 and 5 denote nodes which are both connected to the WAN 10 and the LAN 20. The nodes 4 and 5 are domain name system server (referred to as a DNS server) for executing a program stored in a memory inside of each node itself so that the nodes may manage the domain name and the network address (corresponding to the IP address in this embodiment) in a corresponding manner and notify the NC 3 of the IP address inquired by the NC 3. Concretely, the NC 3 operates to transmit a request message with the domain name set thereon to the DNS 4 or 5 for inquiring the IP address for the domain name. The DNS server 4 or 5 operates to transmit a response message with the corresponding IP address to the domain name set to the request message to the NC 3. If the DNS server 4 or 5 cannot get to know the inquired IP address, the DNS server 4 or 5 operates to cooperate with another DNS server for obtaining the IP address.

A node 6 is a dynamic DNS server (referred to as a DDNS server) which manages the location information and the load conditions of the SPS 2 and 7 and dynamically changes the IP address to be notified, based on the location information of the NC 3 and the managed content of the node 6 itself, when notifying the NC 3 of the IP address for the domain name inquired by the NC 3.

In a case that the domain name of the server (for example, the NCS 1) to which the NC 3 issues an inquiry is to be managed by the DDNS server, the inquiry from the NC 3 reaches the DDNS server 6. If the SPS server (for example, the SPS server 2) is located at a closer location to the NC 3 than the NCS 1, the DDNS server 6 operates to notify the NC 3 of the IP address of the SPS server 2 as the IP address of the NCS 1. Through the use of the received IP address, the NC 3 accesses the SPS server 2 as if it accessed the NCS 1. If the inquired NCS 1 is closer to NC 3 than any other SPS server, the DDNS server 6 operates to notify the NC 3 of the IP address of the NCS 1.

When the DDNS server 6 selects the SPS sever, the distance between the NC 3 and the SPS server as well as the load condition of the SPS server may be considered. For example, even if the SPS server 2 is located at the closest point to the NC 3, the DDNS server 6 may select another SPS server (not shown) if a heavy load is imposed on the SPS server 2.

That is, the DDNS server 6 operates to select the most approximate SPS server (located in the most excellent access environment) to the NC 3.

Further, the domain name of the server inquired by the NC 3 may reach the DDNS server 6 through at least one DNS server (for example, through the DNS servers 4 and 5). In this case, the DDNS server 6 operates to notify the NC 3 of the IP address of the most approximate SPS server through the DNS servers 5 and 4. Hence, if each of the DNS servers 4 and 5 provides a caching function, the IP address of the most approximate SPS sever is temporarily stored in each DNS server. Later, if another NC issues an inquiry of the same domain name to the DNS server 4 or 5, the inquired DNS server 4 or 5 can notify the NC of the IP address temporarily stored therein without inquiring the DDNS server 6 of it.

A node 8 is a gateway server (referred to as a GWS) which enables to exchange a message between the WAN 10 and the LAN 20.

Figure 2:
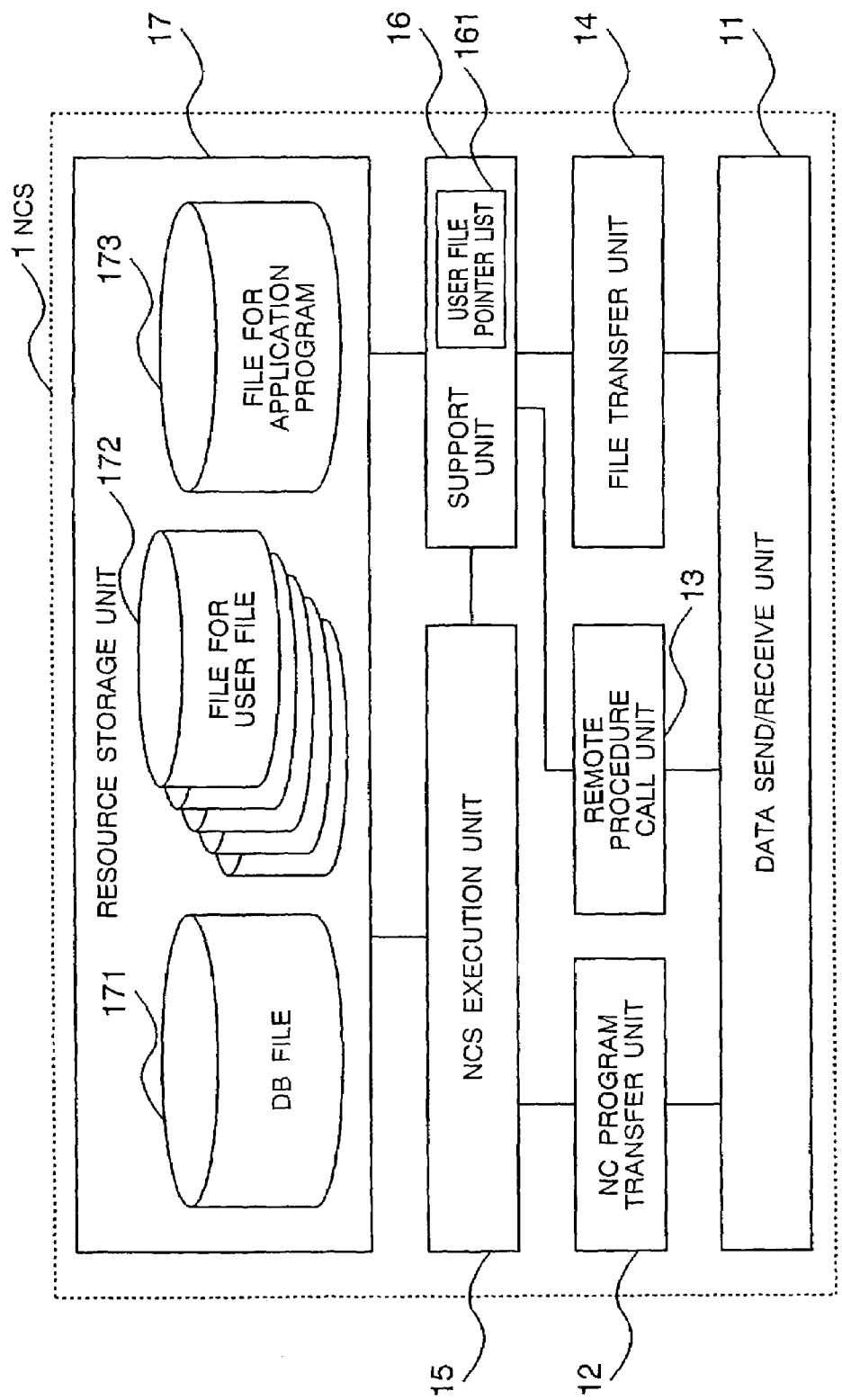
FIG. 2 is a diagram showing a network computer (NCS)

FIG. 2 is a diagram showing the NCS 1.

In FIG. 2, a data send/receive unit 11 operates to send and receive a message to and from a node connected to the WAN 10. The send/receive unit 11 also operates to send and receive a resource or data to and from a module of the NCS 1 in operation.

An NC program transfer unit 12 operates to transfer an NC program, a resource or data to a node connected to the WAN 10.

A remote procedure call unit 13 operates to do a remote procedure call from the node connected to the WAN 10.

A file transfer unit 14 operates to transfer a resource or data to the node connected to the WAN 10.

An NCS execution unit 15 operates to provide the NC 3 with the NC service.

An SPS support unit 16 operates to communicate a resource or data except the NC service with the SPSs 2 and 7. In addition, the SPS support unit 16 is a necessary component to realizing the operation. Herein, it is not necessary.

A resource storage unit 17 provides a database (referred to as a DB) file 171, a file for a user file 172, and a file for an application program 173. It stores the master of the resource or data to be provided to the NC 3 in those files so that it may transfer the stored content to the NC 3 or the SPS 2 or 7 or implement the DB service of the stored content if requested.

Figure 3:
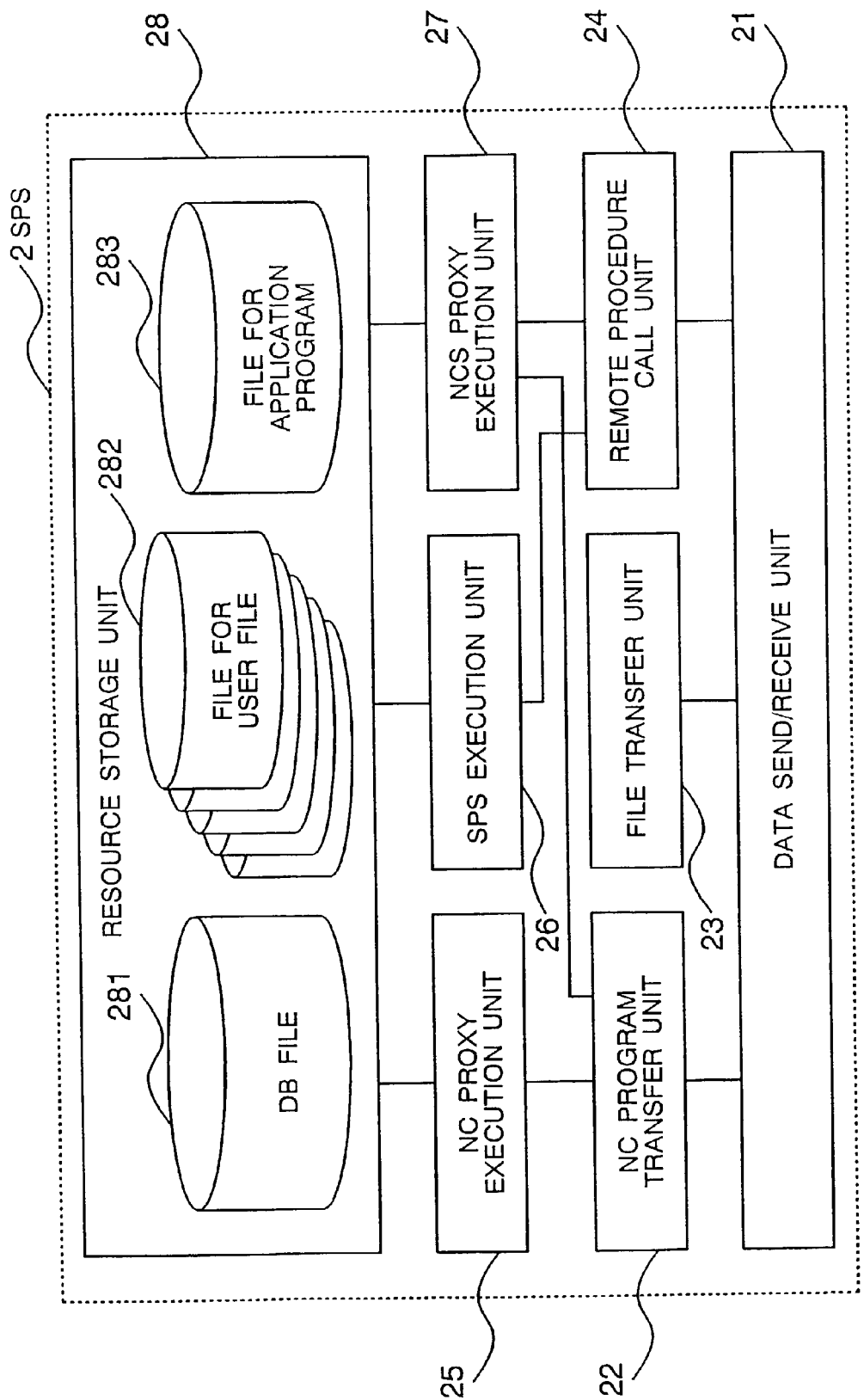
FIG. 3 is a diagram showing a service proxy server (SPS)

FIG. 3 is a diagram showing the SPS 2.

In FIG. 3, a data send/receive unit 21 operates to send and receive a message to and from a node connected to the LAN 20. Or, it also operates to send and receive a resource or data to and from a module of the SPS 2 in operation.

An NC program transfer unit 22 operates to transfer an NC program main body, a resource or data to the node connected to the LAN 20.

A file transfer unit 23 operates to transfer a resource or data to the node connected to the LAN 20.

A remote procedure call unit 24 operates to do a remote procedure call from the node connected to the LAN 20.

An NC proxy execution unit 25 is inputted with the NC service from the NCS 1 connected to the WAN 10.

An NCS proxy execution unit 27 operates to provide the NC 3 connected to the LAN 20 with the NC service.

An SPS execution unit 26 operates to exchange a message with the NC proxy execution unit 25 and the NCS proxy execution unit 27 and issue various instructions to the NC proxy execution unit 25 and the NCS proxy execution unit 27. In the following description, the SPS execution unit 26 operates to communicate a resource or data except the NC service in synchronous or asynchronous to the execution of the NC service with the SPS support unit 16 of the NCS 1 through another path rather than the path used when the NC service is provided.

A resource storage unit 28 provides a DB file 282, a file for a user file 282, and a file for an application program 283 so that it may store the resource or data received from the NCS 1 in those files. The storage unit 28 may transfer the stored content to the NC 3 or implement the DB service of the stored content if requested.

The arrangement of the SPS 7 is likewise to that of the SPS 2.

In turn, the description will be oriented to the procedure to be executed when the SPS 2 tries to take part in the network as a proxy server of the NCS 1.

The SPS execution unit 26 of the SPS 2 obtains the IP address of the DDNS server 6 in an offline manner and transmits the IP address and the location information of the SPS 2 to the DDNS server 6. Herein, the location information may be an area code of an area where the SPS 2 exists or a longitude and a latitude of a location where the SPS 2 exists. In this embodiment, both the area code and the longitude and latitude are used as the location information.

When the DDNS server 6 receives the foregoing information from the SPS 2, the server 6 operates to register the SPS 2 in the SPS information list stored in a memory located inside the server 6. Then, the server 6 operates to transmit to the SPS 2 the minimum resource or data (such as a log-in application program or a basic application program) required by the SPS 2 in operation and the IP address of the NCS 1 required for the SPS 2 to directly communicate with the NCS 1.

When the SPS execution unit 26 of the SPS 2 receives the foregoing information from the DDNS server 6, the SPS execution unit 6 notifies the DDNS server 6 of the completion of the preparation. When the notice from the SPS 2 is received, the DDNS server 6 makes the registered content of the SPS 2 in the SPS information list effective.

Then, the SPS 2 operates to periodically notify the DDNS server 6 of the load condition of the SPS 2. Then, the DDNS server 6 updates the content of the SPS information list. Herein, the load condition may be a consumption condition of a resource such as an occupying rate of a memory or an operativity of a CPU or a number of connected users.

In addition, the content of the SPS information list 700 is shown as FIG. 8. In FIG. 8, two SPSs are registered in the list, in which the occupying rate of the memory is used as the load conditions of these SPSs.

Further, the procedure to be executed when the SPS 7 takes part in the network as the proxy server of the NCS 1 is likewise to the foregoing procedure.

As a result, the DDNS server 6 can get to know the location information of the SPSs 2 and 7 and the load conditions of the SPSs 2 and 7. The server 6 hence enables to execute the dynamic corresponding process (to be described below).

Figure 4:
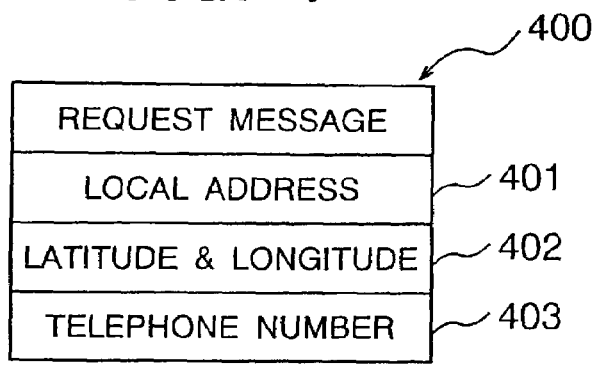
FIG. 4 is an explanatory view showing a format of a request message used for inquiring an IP address.

FIG. 4 shows a format of a request message 400 used for inquiring an IP address of the server from which the service is to be requested.

In addition, reference is made to the details of the message format about the service provided by the DNS server in the writing: Douglas E. COMER, Japanese Translation of "Internet working With TCP/IP Principle, Protocol and Architecture" published by Kyoritu Shuppan-Sha.

In the first embodiment, the request message 400 used when the NC 3 inquires the IP address includes the IP address and the location information of the client NC 3 added thereto. Herein, like the above, the location information may be an area code of a place where the NC 3 exists or a longitude and a latitude of a location where the NC 3 exists. In this embodiment, both the area code and the longitude and the latitude are used as the location information. Further, this location information is transferred without nullification when the DNS server transfers a request message to an upper DNS server.

Figure 5:
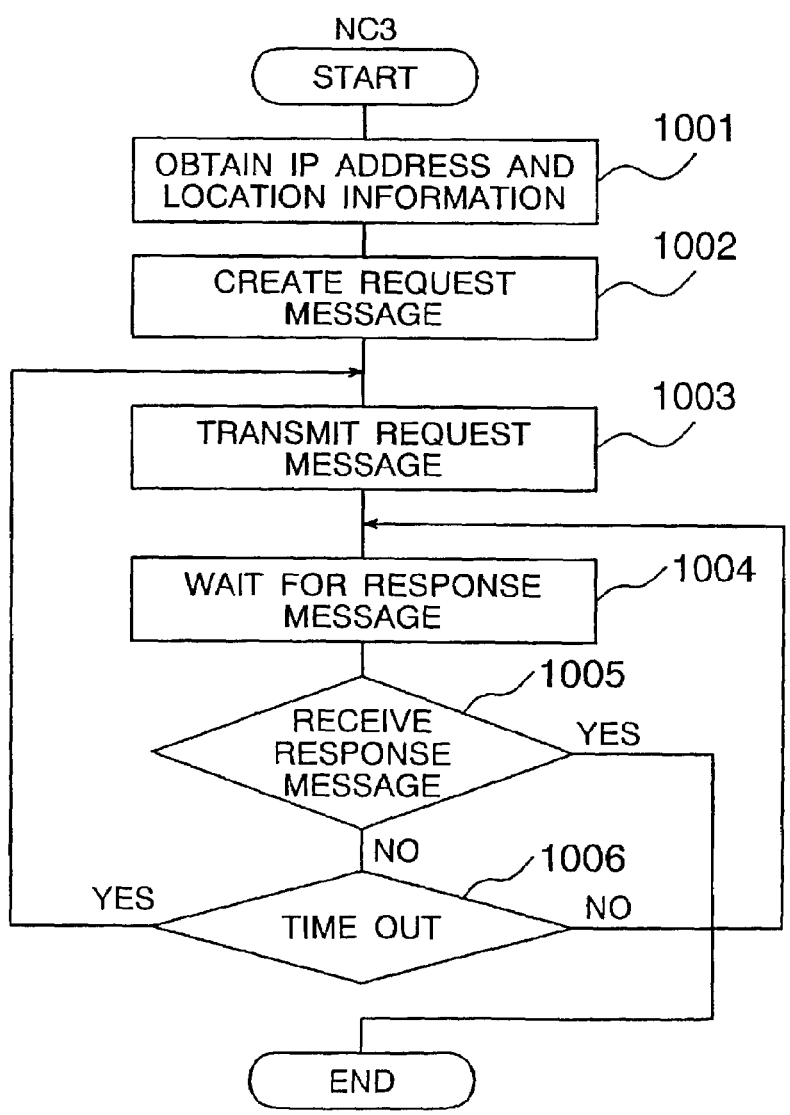
FIG. 5 is a flowchart showing a flow of a process executed when the network computer (NC) obtains an IP address of the NCS.
Figure 6:
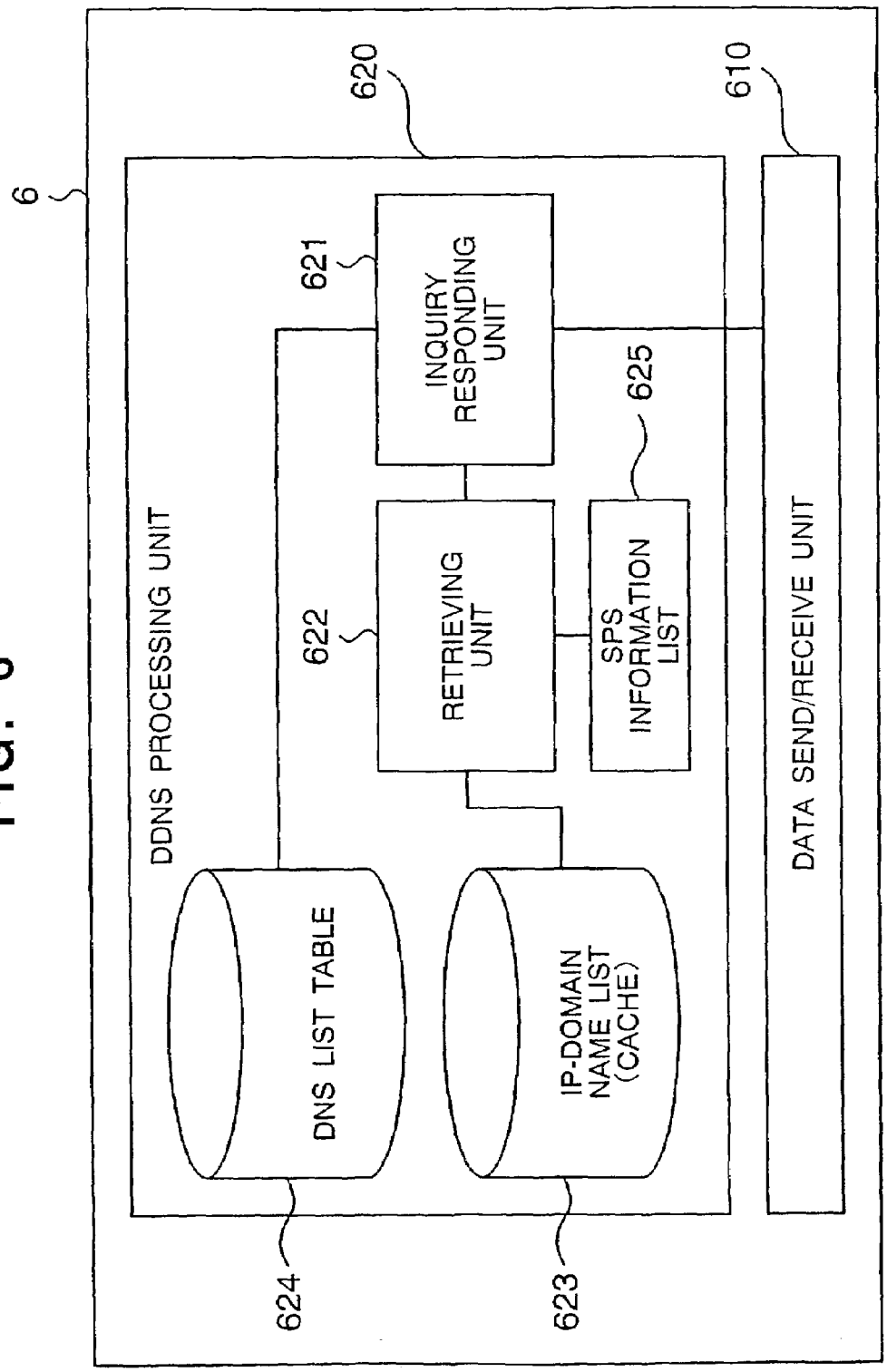
FIG. 6 is a diagram showing a dynamic domain name system (DDNS) server.

In turn, the description will be oriented to how the NC 3 obtains the IP address of the SPS with reference to FIGS. 1, 5 and 6.

As shown in FIG. 5, at first, the NC 3 operates to obtain the IP address and the location information of the NC 3 itself (step 1001). These pieces of information are inputted by the user of the NC 3. In particular, the location information, that is, the longitude and,the latitude can be obtained from the data given by the GPS sensor or the like.

In succession, the NC 3 operates to create a request message shown in FIG. 4 (step 1002). Then, the created request message is transmitted to the DNS server pre-registered as the NDS server of the NC 3 itself (which corresponds to the DNS server 4 in this embodiment) (step 1003).

Then, the DNS server 4 obtains the domain name from the request message transmitted therefrom. If the DNS server 4 manages the IP address corresponding to the obtained domain name by itself, then, the DNS server 4 transmits a response message with the IP address set on to the NC 3. Unless the DNS server 4 manages the target IP address by itself, the request message transmitted thereto is transferred to the DNS server (which corresponds to the DNS server 5 in this embodiment) pre-registered as its upper DNS server.

Then, the DNS server 5 obtains the domain name from the request message transmitted thereto. If the DNS server 5 manages the IP address corresponding to the domain name by itself, the DNS server 5 transmits the response message with the IP address set thereon to the DNS server 4 and then transfers the response message to the NC 3. Unless the DNS server 5 manages the target IP address by itself, like the above, the request message transmitted thereto is transmitted to the DNS server (which corresponds to the DDNS server 6 in this embodiment) pre-registered as the upper DNS server of the DNS server 5.

Turning to FIG. 5, after the NC 3 transmits the request message, the NC 3 waits for the response message to be transmitted (steps 1004 to 1006). Unless the response is transmitted to the NC 3 within a given time, the operation goes back to the step 1003 at which the request message is transmitted again.

In the first embodiment, the DDNS server 6 operates to dynamically correspond the domain name with the IP address of the most approximate SPS to the NC 3 selected among the SPSs for standing proxy for the process of the server of that domain name. By this operation, the DDNS server 6 is arranged to execute the dynamic corresponding process so that the IP address to be sent to the NC 3 may be changed. Later, the dynamic corresponding process executed by the DDNS server 6 is described with reference to FIGS. 6 and 7.

FIG. 6 is a diagram showing the DDNS server 6. In FIG. 6, the data send/receive unit 610 operates to send and receive a message to and from the node connected to the WAN 10 and the DNS server in operation and a resource or data to and from a module of the SPS server in operation.

In a DNS processing unit 620, an inquiry responding unit 621 operates to receive a request message 400 of the NC 3 sent from a lower DNS server through the data send/receive unit 610 and then obtain the domain name from the request message 400. The inquiry responding unit 621 passes the obtained domain name to a retrieving unit 622. The retrieving unit 622 operates to check if the obtained domain name is a domain name of the NCS managed by the DDNS server 6 and pre-stored in an IP-domain list 623 by making reference to the IP-domain name list (which may include a cache) 623.

Unless it is the domain name managed by the DDNS server 6 itself, this fact is given back to the inquiry responding unit 621. Then, the inquiry responding unit 621 makes reference to the DNS list table 624 and then transfers the request message to the upper DNS server.

If it is the domain name managed by the DDNS server 6, the retrieving unit 622 operates to retrieve the IP address of the SPS with the most approximate access environment to the NC 3 (which may be an IP address of the domain name itself) and then pass it to the inquiry responding unit 621. The inquiry responding unit 621 operates to transfer the IP address of the SPS passed thereto to the lower DNS server through a data transmitting unit 610.

In addition, the arrangements of the DNS servers 4 and 5 are likewise to the arrangement shown in FIG. 6 except the SPS information list 625.

Figure 7:
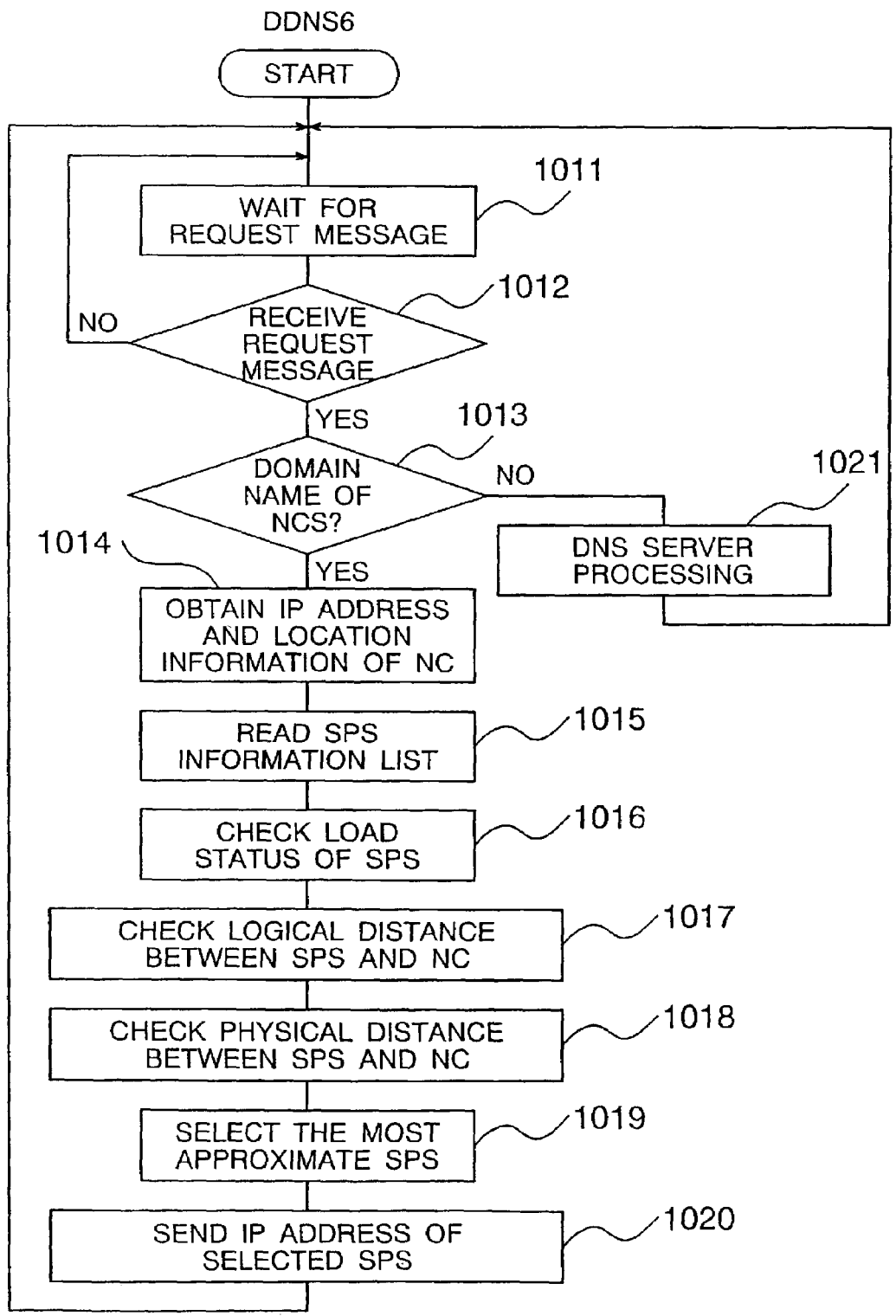
FIG. 7 is a flowchart showing a flow of a dynamic corresponding process to the DDNS server when the NC obtains an IP address of the NCS.

As shown in FIG. 7, the DDNS server 6 waits for the request message (step 1011). When the request message is received (step 1012), the DDNS server 6 obtains the domain name from the request message and then checks if the obtained domain name is a domain name of the NCS 1 (step 1013).

If not (step 1013), like the ordinary DNS servers 4 and 5, the DDNS server operates to transmit the response message with the IP address for the domain name set thereon (step 1021). In addition, another domain name rather than the domain name of the NCS 1 may be a domain name of a mail server, for example.

Further, if yes (step 1013), the DDNS server 6 operates to obtain the IP address and the location information of the NC 3 from the request message (step 1014) and read the SPS information list (step 1015).

Like the example shown in FIG. 8, the SPS information list (625) includes the IP address, the location information and the load condition of each of the SPSs 2 and 7 distributively located on the network. The data for the SPS 2 and the data for the SPS 7 are registered as the informations 801 and 802, respectively.

Then, by making reference to the SPS information list 625, the DDNS server 6 checks for the load condition of each SPS (step 1016), calculates a logical distance between each SPS and the NC 3 from the IP addresses of each SPS and the NC 3 (if necessary, in consideration of the location information of the server (for example, NCS 1) of the pre-stored domain name) (step 1017), and calculate a physical distance between each SPS and the NC3 from the location informations of each SPS and the NC 3 (step 1018).

In succession, the DDNS server 6 selects the most approximate SPS to the NC 3 from the distances calculated at the steps 1017 and 1018 (step 1019). Then, the server 6 operates to send back the response message with the IP address of the selected SPS set thereon to the NC or the lower DNS server (step 1020).

The most approximate SPS to the NC 3 concretely means the SPS that is located as close to the NC 3 as possible and is at as small a load as possible. In actual, however, no relation between the calculated distance and the load contition may bring about the case that an SPS is located closest to the NC 3 but is under the greatest load. Hence, it is preferable that the DDNS server 6 according to the predefined selecting rule indicating that "if the SPS located closest to the NC 3 is under the load conditions of 80% or more, the SPS located second closest to the NC 3 is selected".

By the above operation, the DDNS server 6 enables to notify the NC 3 of the IP address of the SPS provided with the most approximate access environment to the NC 3 (SP 2 in this embodiment). The NC 3 recognizes the SPS 2 of the notified IP address as the NCS 1 though it is actually a proxy server of the NCS 1 and can reach the NC service.

As set forth above, according to this embodiment, unlike the conventional DNS servers 4 and 5 arranged to manage only the stationary correspondence between the domain name and the IP address, the DDNS server 6 provides a capability of managing the location information and the load conditions of the SPSs 2 and 7 located distributively on the network, when notifying the NC 3 of the IP address of the corresponding NCS 1 to the domain name inquired by the NC 3, selecting the SPS served as the most approximate proxy server to the NC 3 and notifying the NC 3 of the IP address of the selected SPS based on the location information of the NC 3 and the managed content of the DDNS server 6.

Hence, the NC 3 can constantly access the SPS to be served as the most approximate proxy server when accessing the NCS 1 merely by specifying a logical node name containing a logical domain name of the NCS 1. Hence, the user of the NC 3 can enjoy a comfortable working environment without lowering a response characteristic.

Further, the SPSs 2 and 7 are not required to manage the user account. Hence, the user may move from the NC 3 to another NC for doing a work.

Moreover, once the SPSs 7 and 7 do the procedure of taking part in the network for standing proxy for the NCS 1, the SPSs 2 and 7 are not substantially required to do the procedure again. It offers the effect that the trouble in the procedure is reduced.

In the foregoing embodiment, the NC 3 recognizes the SPS 2 selected as a proxy server as the NCS 1. Hence, the NC 3 authenticates the access through the procedure for the use of the NCS 1 and can be provided with the NC service from the SPS 2.

Later, the embodiment arranged as above will be described with reference to FIG. 9.

Figure 9:
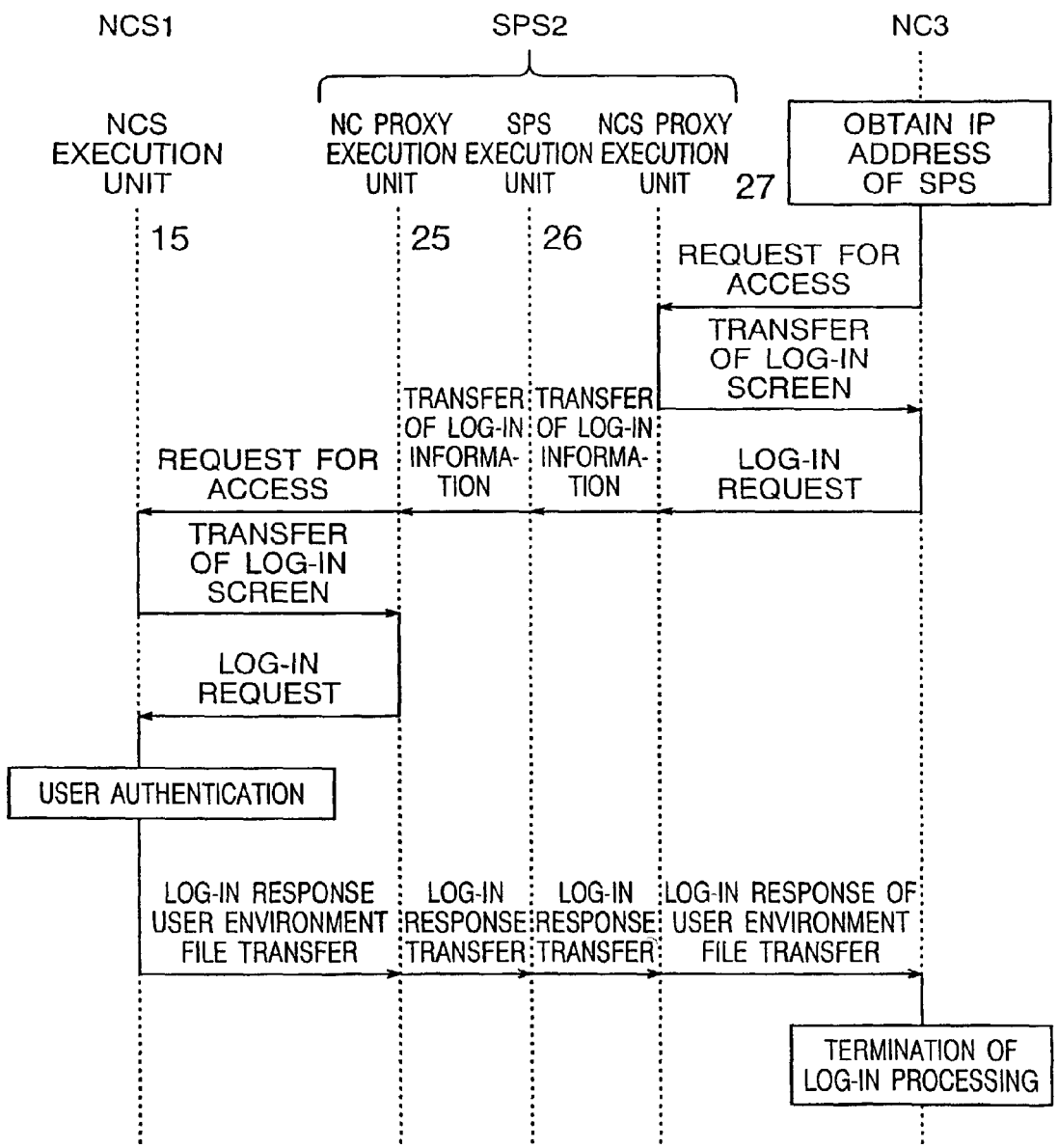

As shown in FIG. 9, after the NC 3 obtains the IP address of the SPS 2 from the response message, the NC 3 issues a request for accessing the NCS proxy execution unit 27 of the SPS 2. Then, the NCS proxy execution unit 27 operates to transfer a log-in screen where a log-in is done to the NC 3.

In this embodiment, the SPS 2 is served as the NCS 1 for the NC 3 that corresponds to the client, so that the NCS 1 stands proxy for a user authenticating request for the NC 3.

In the NC 3, when the user enters the log-in information (concretely, a user ID and a password) on the log-in screen transferred to the NC 3, the NC 3 operates to transmit the log-in request with the entered log-in information set thereon to the NCS proxy execution unit 27 of the SPS 2.

When the NCS proxy execution unit 27 receives the log-in request from the NC 3, the execution unit 27 operates to transfer the log-in information set in the log-in request to the SPS execution unit 26. When the SPS execution unit 26 receives the log-in information from the NCS proxy execution unit 27, the SPS execution unit 26 operates to transfer the received log-in information to the NC proxy execution unit 25 and give an indication of issuing a request for accessing the NCS 1. The NC proxy execution unit 25 issues a request for accessing the NCS 1 according to the indication given from the SPS execution unit 26. When the log-in screen is transferred from the NCS 1, the NC proxy execution unit 25 uses the log-in information received from the SPS execution unit 26 for transmitting the log-in request to the NCS 1.

In this embodiment, the SPS 2 is served as the NC 3 that is a client for the NCS 1. The NC 3 stands proxy for a user authenticating response for the NCS 1.

When the NCS 1 receives the log-in request from the NC proxy execution unit 25 of the SPS 2, the NCS 1 operates to do the user authentication through the use of the log-in information set to the log-in request. If the authentication is given, the log-in response and the user environment file for providing the working screen of the user are transferred to the NC proxy execution unit 25 of the SPS 2.

The NC proxy execution unit 25 of the SPS 2 operates to store in the resource storage unit 28 the log-in response and the user environment file transferred from the NCS 1 and notify the SPS execution unit 26 of the success of the log-in. The SPS execution unit 26 further notifies the NCS proxy execution unit 27 of the success of the log-in. When the success of the log-in is noticed, the NCS proxy execution unit 27 operates to take the log-in response and the user environment file out of the resource storage unit 28, transfer the log-in response and the user environment file to the NC 3, and then terminate the log-in process.

In this embodiment, the SPS 2 is served as the NCS 1 for the NC 3. The NCS 1 stands proxy for noticing a user authenticated result to the NC 3.

When the user authentication is failed in the NCS 1, a message for indicating the failure of the log-in is transmitted from the NCS 1 to the SPS 2. The NC 3 is operated to display the message. The user of the NC 3 can enter the log-in information again for retrying the log-in request.

As described above, according to this embodiment, the SPS 2 selected as a proxy server is served as the NCS 1 for the NC 3 and as the NC 3 for the NCS 1 about the user authentication. Hence, the SPS 2 does not need to manage the user account and can do the log-in process without changing the user authenticating procedure in both the NC 3 and the NCS 1.

By the way, in the foregoing embodiment, when the NC 3 accesses the SPS 2 selected as the proxy server (in actual, after the NC 3 succeeds in the log-in described about the foregoing embodiment), the NC 3 may download an application program from the NCS 1. In this case, like the conventional proxy cache server, if the SPS 2 caches the application program in itself, the SPS 2 may reduce the traffic and the load burdened on the server by transferring the application program cached inside of the SPS 2 to the NC 3.

Hereafter, this kind of process will be described with reference to FIG. 10.

What is important to this process is placed on the respect that the application program downloaded onto the NC 2 must be constantly updated to the latest version, that is, the application program cached inside of the SPS 2 must be constantly updated to the latest version.

Figure 10:
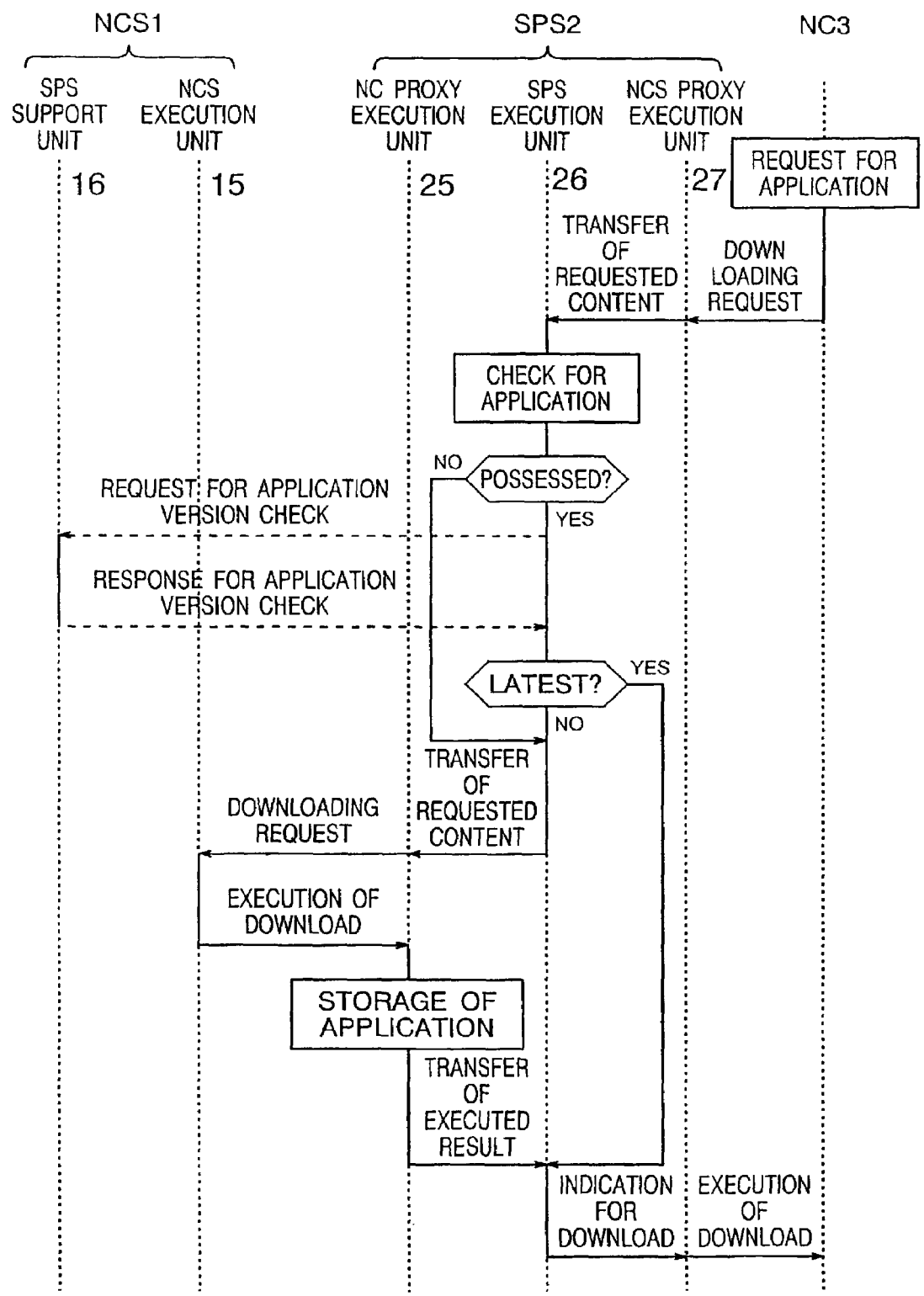
FIG. 10 is an explanatory view showing an operation executed when the NC issues a request of downloading an application program.

As shown in FIG. 10, at first, through the NC 3, the user indicates a request for using the application program on the working screen. Then, the NC 3 operates to transmit a request for downloading the application program to the NCS proxy execution unit 27 of the SPS 2.

When the NCS proxy execution unit 27 receives the downloading request from the NC 3, the content of the downloading request received by the unit 27 is transferred to the SPS execution unit 26. When the SPS execution unit 26 receives the content of the request from the NCS proxy execution unit 27, the SPS execution unit 26 checks for the file for the application program 283 stored in the resource storage unit 28 so that it can determine if the requested application program is stored in the resource storage unit 28.

When the requested application program is stored in the resource storage unit 27, the SPS execution unit 26 of the SPS 2 transmits a request for checking the application version, that is, a request for inquiring the version of the application program to the SPS support unit 16 of the NCS 1.

When the SPS support unit 16 of the NCS 1 receives the request for checking the application version from the SPS execution unit 26 of the SPS 2, the SPS support unit 16 operates to transmit to the SPS execution unit 26 of the SPS 2 an application version check response for indicating the version of the application program of inquiry.

In addition, the request for checking the application version and the response thereto are exchanged between the remote procedure call unit 25 of the SPS 2 and the remote procedure call unit 13 of the NCS 1 through another path rather than the path used by the NCS 1 for providing the NC service.

When the SPS execution unit 26 of the SPS 2 receives the application version check response from the SPS support unit 16 of the NCS 1, the SPS execution unit 26 determines if the application program stored in the file for an application program 283 stored in the resource storage unit 28 is updated to the latest version by collating the version for indicating the received application version check response to the version of the application program stored in the file 283.

If it is the latest version, the SPS execution unit 26 operates to give an indication of downloading the application program stored in the file 283 to the NCS proxy execution unit 27. In accordance with the indication from the SPS execution unit 26, the NCS proxy execution unit 27 operates to download the application program stored in the file 283 of the resource storage unit 28 along the same procedure as the normal one done by the NC 2 for the NCS 1.

Unless the requested application program is stored in the application program file 283 in the resource storage unit 28 or unless the application program stored in the file 283 is the latest version program, the SPS execution unit 26 of the SPS 2 operates to transfer the requested content received from the NCS proxy execution unit 27 to the NC proxy execution unit 24 and indicate the NCS 1 to issue a request for downloading the application program. The NC proxy execution unit 24 uses the requested content received from the SPS execution unit 26 for transmitting a downloading request to the NCS execution unit 15 of the NCS 1 in response to the indication given from the SPS execution unit 26.

When the NCS execution unit 15 of the NCS 1 receives the downloading request from the NC proxy execution unit 24 of the SPS 2, the NCS execution unit 15 starts to download the requested application program. In response, when the NC proxy execution unit 24 of the SPS 2 obtains the application program from the NCS execution unit 15, the NC proxy execution unit 24 stores the obtained application program in the application program file 283 in the resource storage unit 28 and notifies the SPS execution unit 26 of the success of the download.

When the success of the download is noticed, the SPS execution unit 26 of the SPS 2 indicates the NCS proxy execution unit 27 to download the application program stored in the application program file 283 stored in the resource storage unit 28. The NCS proxy execution unit 27 executes the download of the application program stored in the application program file 283 along the same procedure as the normal one done by the NC 3 for the NCS 1 in response to the indication from the SPS execution unit 26.

As described above, the SPS 2 selected as the proxy server enables to transfer the application program to the NC 3 if the application program requested to be downloaded by the NC 3 is updated to the latest version in the application program file 283 in the resource storage unit 28.

Hence, the foregoing operation offers the effects of bringing about no unnecessary access from the SPS 2 to the NCS 1 and reducing the traffic and the load on the server. On the timing when the SPS 2 receives the downloading request from the NC 3, the latest version application program is stored in the SPS 2, so that only the necessary information is stored in the NC 3. This offers the effect of reducing the power consumption of the storage medium.

Further, in a case that the user of the NC 3 re-edit the previously edited user file on the working screen, that is, if the NC 3 is operated to download the user file previously edited by the user of the NC 3 for the use of the file, if the SPS 2 selected as a proxy server caches the latest version of the user file inside of itself, by transferring the user file to the NC 3, the traffic and the load on the server may be reduced.

Figure 11:
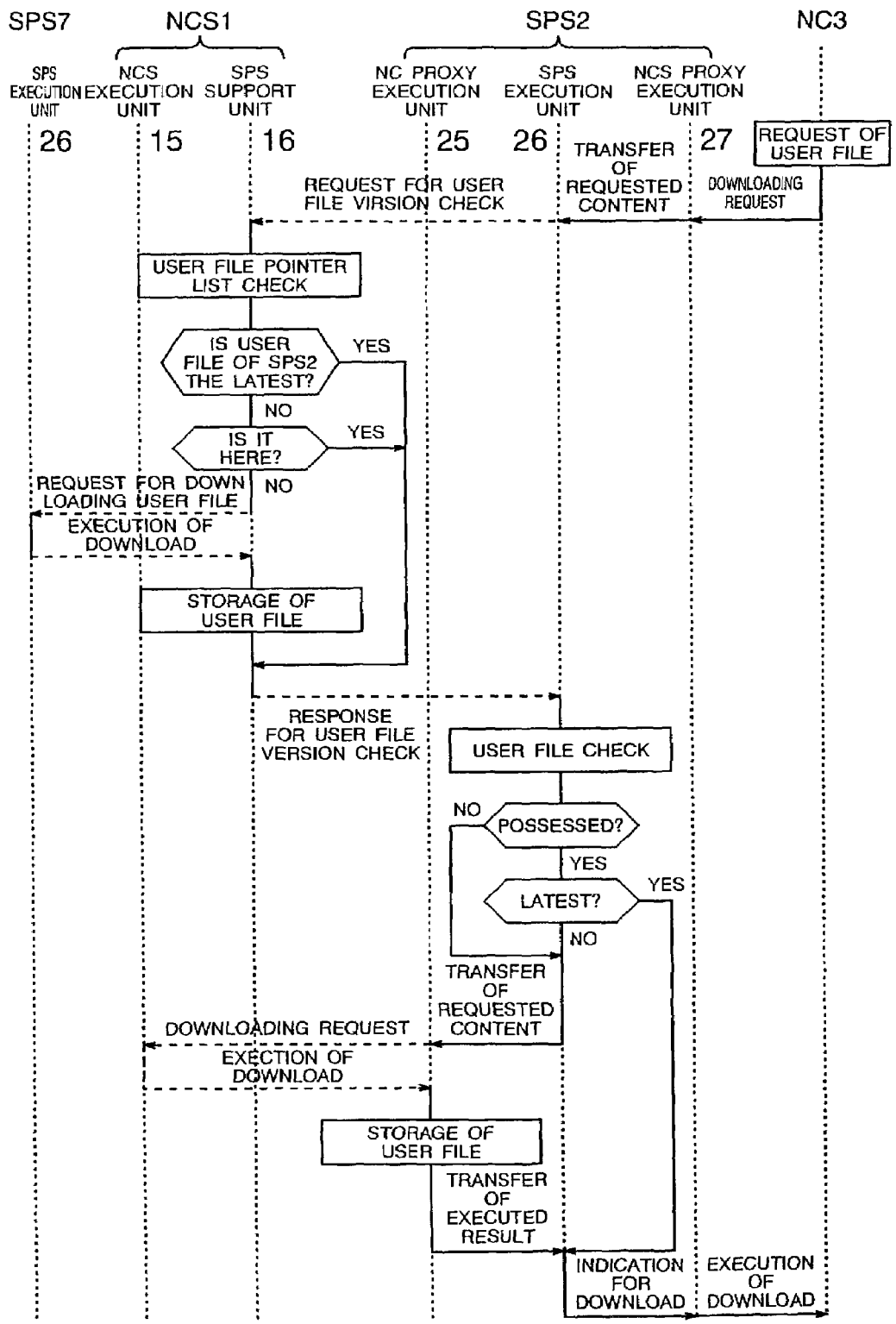
FIG. 11 is an explanatory view showing an operation executed when the NC issues a request of downloading a user file.
Figure 12:
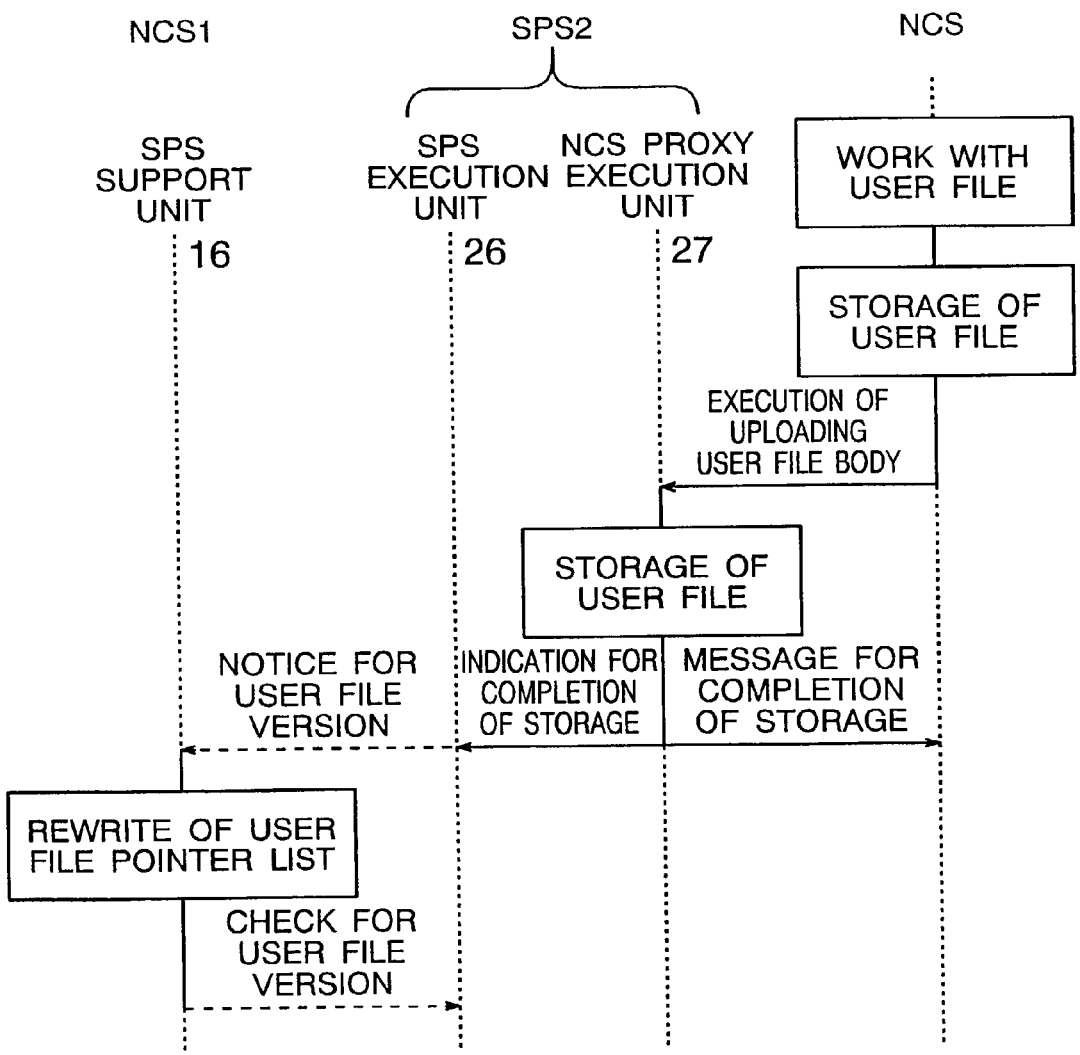
FIG. 12 is an explanatory view showing an operation executed when the NC issues a request of downloading a user file.

Hereafter, the description will be oriented to such a process with reference to FIGS. 11 and 12.

In FIG. 11, it is assumed that the NC 3 records the file name of the previously edited user file on the working screen of the NC 3 user. When the user specifies the file name for indicating the request for using the user file, the NC 3 operates to transmit the request for downloading the user file to the NCS proxy execution unit 27 of the SPS 2.

When the NCS proxy execution unit 27 receives the downloading request from the NC 3, the NCS proxy execution unit 27 operates to transfer to the SPS execution unit 26 the content of the downloading request received by the execution unit 27. When the SPS execution unit 26 receives the content of the request from the NCS proxy execution unit 27, the SPS execution unit 26 operates to transmit to the SPS support unit 16 of the NCS 1 the user file version check request for inquiring the version of the requested user file.

When the SPS support unit 16 of the NCS 1 receives the user file version check request from the SPS execution unit 26 of the SPS 2, the SPS support unit 16 makes reference to the user file pointer list 161 for checking where the latest version of the user file of inquiry is located.

Further, the user file pointer list 161 stores the information for indicating the location of the latest version in each user file. The method for storing the information will be described below with reference to FIG. 12. In addition, the latest version of the user file means the user file with the latest time stamp added thereto.

If it is determined that the latest version of the user file of inquiry is located in the SPS 7, the SPS support unit 16 of the NCS 1 operates to transmit the request for downloading the user file to the SPS execution unit 26 of the SPS 7 for the purpose of obtaining the user file of the SPS 7. Then, the obtained user file is stored in the file for a user file 172 of the resource storage unit 17. At this time, the SPS support unit 16 rewrites the stored content of the user file pointer list 161 into the information indicating that the latest version of the obtained user file is located in the NCS 1.

Then, the SPS support unit 16 of the NCS 1 operates to transmit to the SPS execution unit 26 of the SPS 2 the user file version check response for indicating where the latest version of the user file is located (herein, NCS 1).

Further, if it is determined that the latest version of the request user file is stored in the file for a user file 172 of the NCS 1, the SPS support unit 16 of the NCS 1 operates to transmit to the SPS execution unit 26 of the SPS 2 the user file check response for indicating where the latest version of the user file is located (herein, NCS 1).

Moreover, if it is determined that the latest version of the requested user file is located in the SPS 2, the SPS support unit 16 of the NCS 1 operates to transmit to the SPS execution unit 26 of the SPS 2 the user file version check response for indicating where the latest version of the user file is located (herein, SPS 2).

The user file version check request and the response thereto are exchanged between the remote procedure call unit 24 of the SPS 2 and the remote procedure call unit 13 of the NCS 1 through another path rather than the path used by the NCS 1 for providing the NC service.

When the SPS execution unit 26 of the SPS 2 receives the user file version check response from the SPS support unit 16 of the NCS 1, the SPS execution unit 26 operates to check the file for a user file 282 in the resource storage unit 28 and check if the requested user file is stored in the SPS 2.

If the requested user file is stored in the SPS 2, the SPS execution unit 26 of the SPS 2 determines if the latest version of the user file is stored in the file for a user file 282 stored in the resource storage unit 28.

If the latest version is stored in the file 282, the SPS execution unit 26 of the SPS 2 operates to indicate the NCS proxy execution unit 27 to download the user file stored in the file for a user file 282 stored in the resource storage unit 28. The NCS proxy execution unit 27 executes the download of the user file stored in the file 282 along the same procedure as the ordinary one done by the NC 3 for the NCS 1 in response to the indication given from the SPS execution unit 26.

Further, if the requested user file is not stored in the file 282 of the resource storage unit 28 of the SPS 2 itself or if the user file stored in the file 282 is not the latest version, it is understood from the latest version of the user file is located in the NCS 1 from the user file version check response. Hence, the SPS execution unit 26 of the SPS 2 transfers the requested content received from the NCS proxy execution unit 27 to the NC proxy execution unit 24 and indicates the NCS 1 to issue a request for downloading the user file. The NC proxy execution unit 4 uses the requested content received from the SPS execution unit 26 for transmitting the downloading request to the NCS execution unit 15 of the NCS 1 in response to the indication given from the SPS execution unit 26.

When the NCS execution unit 15 of the NCS 1 receives the downloading request from the NC proxy execution unit 25 of the SPS 2, the NCS execution unit 15 executes the download of the requested user file. When the NC proxy execution unit 25 of the SPS 2 obtains the user file from the NCS 1, the NC proxy execution unit 25 stores the obtained user file in the file for a user file 282 and notifies the SPS execution unit 26 of the success of the download.

When the success of the download is noticed, the SPS execution unit 26 of the SPS 2 indicates the NCS proxy execution unit 27 to download the user file stored in the file 282. The NCS proxy execution unit 27 executes the download of the user file stored in the file 282 along the same procedure as the ordinary one done by the NC 3 for the NCS 1 in response to the indication given from the SPS execution unit 26.

As described above, the SPS 2 selected as a proxy server may be arranged to transfer the user file to the NC 3 if the latest version of the user file requested by the NC 3 to be downloaded is stored in the file for a user file 282 of the resource storage unit 28.

The foregoing operation thus makes it possible to eliminate the unnecessary access from the SPS 2 to the NCS 1, thereby possibly reducing the traffic and the load on the server. Further, on the timing when the SPS 2 receives the downloading request from the NC 3, the latest version of the user file is stored in the SPS 2, so that only the necessary information to the NC 3 may be stored. This makes it possible to reduce the power consumption of the storage medium.

Further, the SPS 2 executes the NC service of each user though it does not need the resource management and the user management. The special management cost is not required for the SPS 2. Only the substantial management for the NCS 1 is required.

In turn, the description will be oriented to how the NCS 1 operates to store the information for indicating the location of the latest version of the user file in the user file pointer list 161 with reference to FIG. 12.

The user of the NC 3 terminates the editing operation of the user file of the latest version obtained by the above operation and indicates a request for storing the user file. Then, the NC 3 operates to transmit the request for uploading the user file to the NCS proxy execution unit 27 of the SPS 2 together with the substantial content of the user file.

When the NCS proxy execution unit 27 of the SPS 2 receives the uploading request from the NC 3, the NCS proxy execution unit 27 operates to store the substantial content of the user file received together with the uploading request in the file for a user file 282 of the resource storage unit 28. On completion of the storage, the NCS proxy execution unit 27 operates to notify the NC 3 of the completion of the storage and the SPS execution unit 26 of the completion of the storage. When the completion of the storage is noticed, the SPS execution unit 26 operates to transmit the user file version notice for indicating the version of the user file to the SPS support unit 16 of the NCS 1.

In response to the user file version notice, the SPS support unit 16 of the NCS 1 can update the user file pointer list 161. That is, the SPS support unit 16 rewrites the stored content of the user file pointer list 161 into the information for indicating that the latest version of the noticed user file is located in the SPS 2.

On completion of updating the user file pointer list 161, the SPS support unit 16 of the NCS 1 operates to transmit to the SPS execution unit 16 of the SPS 2 a user file version check for indicating the completion of the update.

Until the user file version check is given back from the SPS support unit 16 of the NCS 1, the SPS execution unit 26 of the SPS 2 continues transmission of the user file version notice.

By the way, if the latest version of the user file of inquiry is located neither in the NCS 1 nor in the inquiring SPS 2, the NCS 1 obtains the user file from its location (in the foregoing embodiment, SPS 7) before transmitting the user file version check response. In place, the NCS 1 may be arranged to transmit the user file version check response for indicating that the latest version of the user file is located in the SPS 7 and then obtain the latest version of the user file from the SPS 7 when the downloading request is transmitted from the SPS 2.

In the foregoing embodiment, the user of the NC 3 may retrieve the database (DB) on the working screen. Concretely, the NC 3 may access the DB file 171 of the NCS 1 through the SPS 2 selected as the proxy server. In this case, when an access frequency is high, by transferring the body of the database from the NCS 1 to the SPS 2, it is possible to reduce the traffic and the load burdened on the server.

Hereafter, this type of process will be described with reference to FIG. 13.

Figure 13:
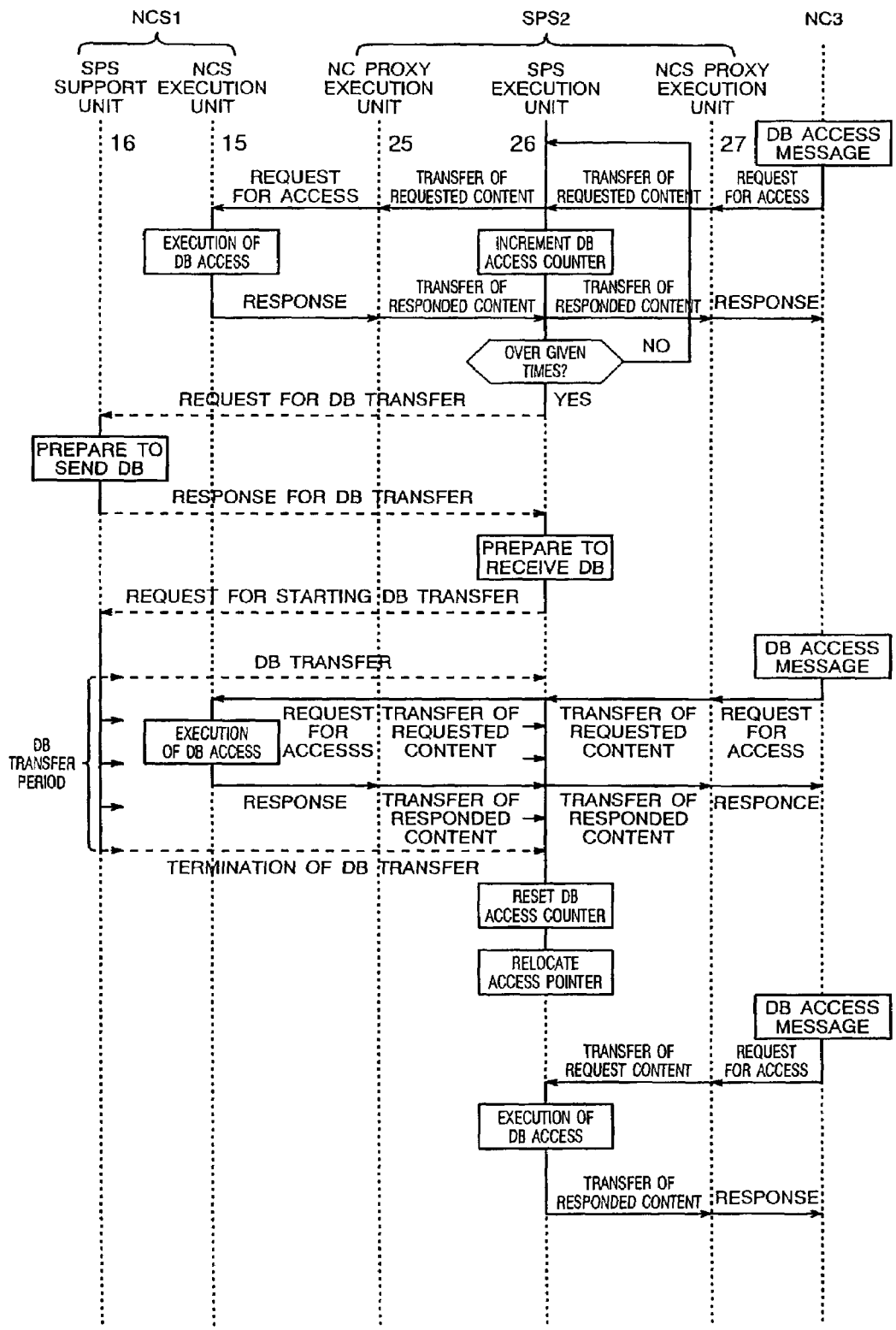
FIG. 13 is an explanatory view showing an operation executed when the NC retrieves a database.

As shown in FIG. 13, when the user indicates to retrieve the database on the working screen of the NC 3, the NC 3 operates to transmit the request for accessing the database to the NCS proxy execution unit 27 of the SPS 2.

When the NCS proxy execution unit 27 of the SPS 2 receives the access request from the NC 3, the NCS proxy execution unit 27 transfers the content of the received access request to the SPS execution unit 26. The SPS execution unit 26 transfers the requested content received from the NCS proxy execution unit 27 to the NC proxy execution unit 24, when the SPS execution unit 26 may be arranged to count the times of access from the NC 3 to the DB. That is, for example, the SPS execution unit 26 may be arranged to increment the corresponding DB access counter to the NC 3.

When the NC proxy execution unit 24 of the SPS 2 receives the requested content from the SPS execution unit 26, the NC proxy execution unit 24 creates the access request through the use of the requested content received by the execution unit 24 itself. By transmitting the created access request to the NCS execution unit 15 of the NCS 1, the NC proxy execution unit 24 can access the DB file 171 through the NCS execution unit 15 of the NCS 1.

The accessed result is sent back in the reverse path to the path of the access request, that is, from the NCS 1 to the NC 3 through the SPS 2.

Then, the SPS execution unit 26 of the SPS 2 determines if the times of the access of the DB done by the NC 3 (the value of the DB access counter) exceeds the predetermined times (for example, 20 times). If they exceed the predetermined times, the SPS execution unit 26 operates to transmit the DB transfer request for requesting the transfer of the DB body to the NCS support unit 16 of the NCS 1.

When the NCS support unit 16 of the NCS 1 receives the DB transfer request from the SPS execution unit 26 of the SPS 2, the NCS support unit 16 performs the process of locking the access to the DB file 171 such as prohibition of writing onto the DB file 171, and starts to prepare the transmission of the DB body. On completion of preparing the transmission, the DB transfer response for indicating that the transfer of the DB body is enabled is transmitted to the SPS execution unit 26 of the SPS 2.

If the write onto the DB takes place, the NCS support unit 16 of the NCS 1 operates to transmit the DB transfer response for indicating that the transfer of the DB body is disabled to the SPS execution unit 26 of the SPS 2. In addition, the DB transfer request and the response thereto are exchanged between the file transfer unit 22 of the SPS 2 and the file transfer unit 14 of the NCS 1 through another path rather than the path used by the NCS 1 for providing the NC service, (which corresponds to the DB retrieval service, herein).

When the SPS execution unit 26 of the SPS 2 receives the DB transfer response for indicating the transfer of the DB body is enabled from the NCS support unit 16 of the NCS 1, the NCS support unit 16 starts the preparation of receiving the DB body, such as securement of a storage area of the DB body on the DB file 281 of the resource storage unit 28. Upon completion of preparing the receipt, the request for starting to transfer the DB body is transmitted to the SPS support unit 16 of the NCS 1.

When the SPS support unit 16 of the NCS 1 receives the request for starting to transfer the DB from the SPS execution unit 26 of the SPS 2, the SPS support unit 16 operates to take the DB body out of the DB file 171 and transfer it to the SPS execution unit 26 of the SPS 2. Upon completion of the transfer, the SPS support unit 16 transmits the DB transfer termination for indicating that the transfer is completed to the SPS execution unit 26 of the SPS 2.

In addition, the request for starting to transfer the DB, the transfer of the DB body, and the termination of the DB transfer are exchanged between the file transfer unit 22 of the SPS 2 and the file transfer unit 14 of the NCS 1 through another path rather than the path used by the NCS 1 for providing the NC service, (which corresponds to the DB retrieval service, herein). Hence, as shown in FIG. 13, both of the processes can be executed at a time.

On the other hand, when the SPS execution unit 26 of the SPS 2 receives the DB body from the SPS support unit 16 of the NCS 1, the received DB body is sequentially stored in the storage area secured on the DB file 281 of the resource storage unit 28. Then, when the SPS execution unit 26 receives the termination of the DB transfer from the SPS support unit 16 of the NCS 1, it is understood that the transfer of the DB body is completed. Hence, the DB access counter is reset. At a time, the SPS execution unit 26 performs the process of changing the DB file 281 of the resource storage unit 28. Concretely, this is a process of relocating the access pointer with the access target of the NC 3 described thereon from the NCS 1 to the SPS 2.

Later, the access request received by the NCS proxy execution unit 27 of the SPS 2 from the NC 3 is transferred to the SPS execution unit 26. Then, through the SPS execution unit 26, the DB file 281 of the resource storage unit 28 is accessed, so that the retrieved result is sent to the NC 3 through the NCS proxy execution unit 27.

As described above, when the frequency of the NC 3 access to the DB is high, the SPS 2 selected as a proxy server is provided with the DB body by the NCS 1. Then, the SPS 2 may use the DB body for providing the same DB retrieval service as the service provided by the NCS 1 to the NC 3.

This operation thus makes it possible to reduce the traffic and the load burdened on the server and provide the NC 3 with a comfortable working environment to the user.

Figure 14:
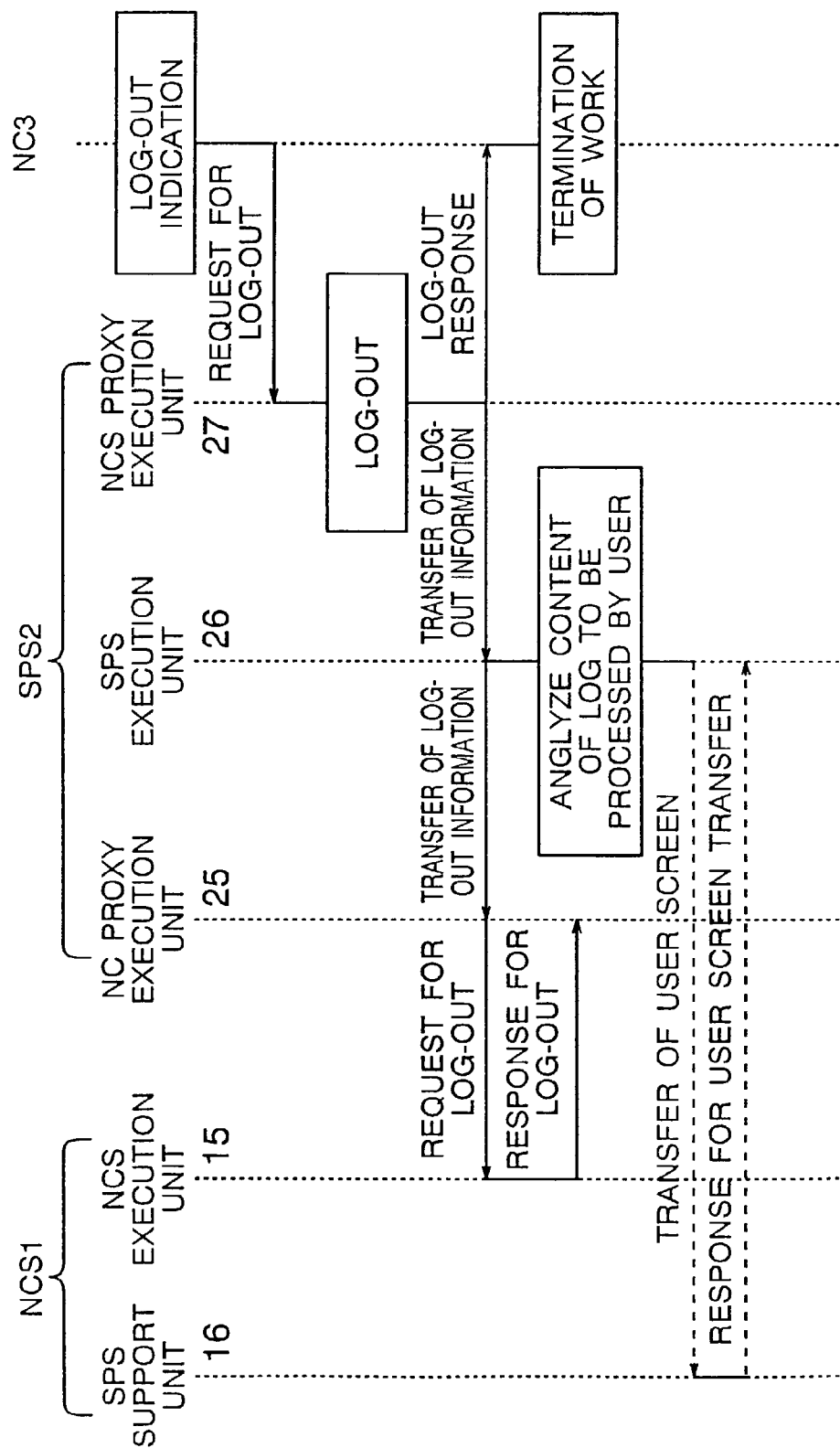
FIG. 14 is an explanatory view showing an operation executed when the NC does a log-out.

Now, the description will be oriented to a log-out process corresponding to the aforementioned log-in process with reference to FIG. 14.

As shown in FIG. 14, the user of the NC 3 indicates a log-out on the NC 3. Then, the NC 3 transmits the log-out request to the NCS proxy execution unit 27 of the SPS 2.

When the NCS proxy execution unit 27 of the SPS 2 receives the log-out request from the NC 3, the NCS proxy execution unit 27 performs the log-out process including holding of a working screen for the user of the NC 3 and then transmits to the NC 3 the log-out response for indicating the completion of the log-out. When the NC 3 receives the log-out response from the NCS proxy execution unit 27 of the SPS 2, the NC 3 operates to close the working screen for the user and then terminates the NC service.

As described above, the SPS 2 is served as the NCS 1 for the NC 3 that corresponds to the client. That is, the SPS 2 stands proxy for the log-out response done by the NCS 1 for the NC 3.

Further, the NCS proxy execution unit 27 of the SPS 2 operates to transmit to the SPS execution unit 26 the log-out information set in the log-out request received from the NC 3. Then, the SPS execution unit 26 gives an indication of transferring to the NC proxy execution unit 25 the log-out information received from the NCS proxy execution unit 27 and to the NCS 1 the log-out request.

In accordance with the indication given from the SPS execution unit 26, the NC proxy execution unit 25 of the SPS 2 issues the log-out request to the NCS execution unit 15 of the NCS 1 and receives the log-out response from the NCS execution unit 15 of the NCS 1. As described above, for the NCS 1, the SPS 2 is served as the NC 3 that is the client. The SPS 2 stands proxy for the log-out request done by the NC 3 for the NCS 1.

Further, the SPS execution unit 26 of the SPS 2 operates to analyze the log of the process having being executed by the user of the NC 3 up to the current point, create a history about the version of the application program used by the user of the NC 3, the user file used by the user of the NC 3, and the DB accessed by the user of the NC 3. Then, the SPS execution unit 26 transfers the working screen at the log-out of the user to the SPS support unit 16 of the NCS 1 and then terminates the process served as a proxy server.

When the foregoing log-in process is done, the user environment file is transferred to the NC that issues the log-in request so that the file may provide the NC with the working screen transferred onto the NCS 1.

By the way, for further putting out the ability of the aforementioned SPSs, those SPSs are arranged to be distributively located on a client-server network system arranged on the concept that the clients are all managed on the server side, which is now highly estimated as the next-generation internet/intranet system.

Further, the SPS may operate in the aforementioned manner if the conventional DNS server manages the domain name and the IP address in a stationary manner.

That is, even in the conventional network system where no DDNS server 6 exists, change of the arrangements of the NCS and the SPS into the arrangements shown in FIGS. 2 and 3 may offer the same effect as that offered by the process of the SPS.

What is claimed is:

1. A proxy server for relaying an access from a client to a server, said proxy server coupled to a network including the server for providing a service and the client for receiving the service, said proxy server comprising:
   a measuring unit for measuring a number of accesses by the client to a resource on the server;
   a resource obtaining unit for obtaining said resource from the server if the number of accesses measured by said measuring unit exceeds a predetermined threshold value;
   a resource storing unit for storing said resource obtained by said resource obtaining unit; and
   an access destination switching unit for switching an access destination of the client to said resource stored in said resource storing unit.

2. A proxy server for relaying an access from a client to a server, said proxy server coupled to a network including the server for providing a service, other proxy servers and the client for receiving the service, said proxy server comprising:
   a resource storing unit for storing a resource of a user;
   a resource determining unit for determining if a latest resource is stored in said resource storing unit after receiving a downloading request to download said resource from the client;
   a first resource transfer unit for transferring the latest resource stored in said resource storing unit to the client if said resource determining unit determines that the latest resource is stored in said resource storing unit;
   a resource obtaining unit for obtaining the latest resource if said resource determining unit determines that the latest resource is not stored in said resource storing unit; and a second resource transfer unit for storing the latest resource obtained by said resource obtaining unit in said resource storing unit and for transferring the latest resource stored in the resource storing unit to the client.

3. The proxy server as claimed by claim 2, wherein:

said resource storing unit stores said resource if said resource is transferred from the client to said proxy server, said proxy server further comprises a notifying unit for notifying the server that said latest resource is located in said proxy server if said resource storing unit stores said resource, and said resource determining unit transmits a request to the server, said request for inquiring a location of the latest resource, said resource determining unit for obtaining a response from said request and determining if the latest resource is stored in said resource storing unit based on said request.

4. A server for providing a service, said server being coupled to a network including clients and proxy servers, one of said clients for receiving the service, one of said proxy servers for standing proxy for a request provided by said one client, said server comprising:

a resource storing unit for storing a resource of a user;

a location storing unit for storing a location of a latest resource;

a location updating unit for updating a stored content of said location storing unit if a notice is received from a proxy server indicating that the latest resource is located at the resource storing unit;

a location identifying unit for identifying a location of the latest resource of inquiry based on the stored content of said location storing unit, if a request for inquiring a location of the latest resource is provided by said one proxy server;

a first location responding unit for transmitting information to said one proxy server indicating that a location identified by said location identifying unit is either said one proxy server or the server;

a resource obtaining unit for obtaining the latest resource if the location identified by said location identifying unit is neither said one proxy server nor said server; and a second location responding unit for storing the latest resource obtained by said resource obtaining unit in said resource storing unit, for updating the stored content of said location storing unit, and for transmitting a response to said one proxy server indicating that the location of the latest resource is said server.

5. A recording medium storing a program to be executed by a server for providing a service, said server being coupled to a network including clients and proxy servers, one of said clients for receiving the service, one of said proxy servers for standing proxy for a request provided by said one client, said program when executed causes said server to perform the steps of:

storing a resource of a user in a resource storing unit;

storing a location of a latest resource in a location storing unit;

updating, by a location updating unit, a stored content of said location storing unit if a notice is received from a proxy server indicating that the latest resource is located at the resource storing unit;

identifying, by a location identifying unit, a location of the latest resource of inquiry based on the stored content of said location storing unit, if a request for inquiring a location of the latest resource is provided by said one proxy server;

transmitting to said one proxy server, by a first location responding unit, information indicating that a location identified by said location identifying unit is either said one proxy server or the server;

obtaining, by a resource obtaining unit, the latest resource if the location identified by said location identifying unit is neither said one proxy server nor said server; and storing, by a second location responding unit, the latest resource obtained by said resource obtaining unit in said resource storing unit, updating the stored content of said location storing unit, and transmitting to said one proxy server a response indicating that the location of the latest resource is said server.

* * * * *